US012770259B2

(12) United States Patent
Lossau et al.

(10) Patent No.: US 12,770,259 B2
(45) Date of Patent: Oct. 20, 2026

(54) AUTOMATIC RIB FRACTURE DETECTION FROM UNFOLDED SCAN IMAGES

(71) Applicant: KONINKLIJKE PHILIPS N.V., Eindhoven (NL)

(72) Inventors: Tanja Lossau, Hamburg (DE); Christian Buerger, Hamburg (DE); Cristian Lorenz, Hamburg (DE); Heike Carolus, Ahrensburg (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 182 days.

(21) Appl. No.: 18/851,737

(22) PCT Filed: Apr. 2, 2023

(86) PCT No.: PCT/EP2023/058599
§ 371 (c)(1),
(2) Date: Sep. 27, 2024

(87) PCT Pub. No.: WO2023/194267
PCT Pub. Date: Oct. 12, 2023

(65) Prior Publication Data

US 2025/0200746 A1 Jun. 19, 2025

Related U.S. Application Data

(60) Provisional application No. 63/327,033, filed on Apr. 4, 2022.

(30) Foreign Application Priority Data

Jul. 7, 2022 (EP) .................................... 22183638

(51) Int. Cl.
*G06T 7/00* (2017.01)
*G06T 3/14* (2024.01)
*G06T 7/11* (2017.01)

(52) U.S. Cl.
CPC .............. *G06T 7/0012* (2013.01); *G06T 3/14* (2024.01); *G06T 7/11* (2017.01); *G06T 2200/04* (2013.01);
(Continued)

(58) Field of Classification Search
CPC . G06T 7/0012; G06T 3/14; G06T 7/11; G06T 2200/04; G06T 2207/10081;
(Continued)

(56) References Cited

U.S. PATENT DOCUMENTS 8,126,240 B2 2/2012 De Bruijne
9,241,634 B2 1/2016 Wang
(Continued)

FOREIGN PATENT DOCUMENTS

CN 113643176 A * 11/2021 ............... G06T 7/11
DE 112005002666 T5 * 9/2007 ............... G06T 7/60
(Continued)

OTHER PUBLICATIONS

PCT International Search Report, International application No. PCT/EP2023/058599, Jul. 14, 2023.
(Continued)

*Primary Examiner* — Andrew W Bee
(74) *Attorney, Agent, or Firm* — Larry Liberchuk

(57) ABSTRACT

Method and apparatus of automatic fracture detection from imaging scans are disclosed. A innovative manifold view combing advantages of earlier approaches while avoiding the limitations of these approaches is coupled with a deep learning based fracture detection model. Ribs and spine from a three-dimensional scan are segmented, rib centerlines
(Continued)

and vertebra center landmarks are detected and labeled. Three-dimensional position coordinates corresponding to the received data are mapped to a defined two-dimensional manifold plane followed by interpolation and sampling techniques to generate a two-dimensional manifold slice and corresponding mapping function. A three-dimensional visualization of the rib cage is generated from a plurality of manifold slices. A trained fracture prediction model receives the plurality of manifold slices and generates a revised stack of two-dimensional manifold slices showing predicted fractures. The predicted fractures may be shown in the two-dimensional manifold slice or mapped back to the image space of the original three-dimensional scan.

15 Claims, 7 Drawing Sheets

(52) U.S. Cl.
CPC ............... *G06T 2207/10081* (2013.01); *G06T 2207/10088* (2013.01); *G06T 2207/10104* (2013.01); *G06T 2207/10108* (2013.01); *G06T 2207/30008* (2013.01)

(58) Field of Classification Search
CPC . G06T 2207/10088; G06T 2207/10104; G06T 2207/10108; G06T 2207/30008
See application file for complete search history.

(56) References Cited

U.S. PATENT DOCUMENTS

| | | | | |
|---|---|---|---|---|
| 9,576,353 | B2 | 2/2017 | Mahn | |
| 2013/0070996 | A1* | 3/2013 | Liu | G06T 7/0012 382/131 |
| 2015/0131881 | A1* | 5/2015 | Gnanamani | G06T 15/10 382/131 |
| 2020/0058098 | A1 | 2/2020 | Hirakawa | |

FOREIGN PATENT DOCUMENTS

| | | | |
|---|---|---|---|
| JP | 2013235380 | A | 11/2013 |
| JP | 2014158628 | A | 9/2014 |
| WO | WO2023186729 | A1 | 10/2023 |

OTHER PUBLICATIONS

Ibanez V. et al., "RiFNet: Automated Rib Fracture Detection in Postmortem Computed Tomography", Forensic Science, Medicine, and Pathology, Springer US, Boston, vol. 18, No. 1, Oct. 2021, pp. 20-29, XP037715789.

Kretschmer J. et al., "ADR—Anatomy-Driven Reformation", IEEE Transactions on Visualization and Computer Graphics, IEEE, USA, vol. 20, No. 12, Dec. 2014, pp. 2496-2505, XP011563302.

Tobon-Gomez C. et al., "Unfolded Cylindrical Projection for Rib Fracture Diagnosis", Advances in Databases and Information Systems; [Lecture Notes in Computer Science; Lect.Notes Computer], Springer International Publishing, Cham, pp. 36-47, Jan. 2018, XP047514304.

Von Berg J. et al., "Model Based Rib-Cage Unfolding for Trauma CT", Progress in Biomedical Optics and Imaging, SPIE—International Society for Optical Engineering, Bellingham, WA, US, vol. 10574, Mar. 2, 2018, pp. 105742E-105742E, XP060103143.

Weikert T. et al., "Assessment of a Deep Learning Algorithm for the Detection of Rib Fractures on Whole-Body Trauma Computed Tomography", Korean Journal of Radiology (KJR), vol. 21, No. 7, pp. 891-899, 2020.

Tan M. et al., "Efficientdet: Scalable and Efficient Object Detection", Proceedings of the IEEE/CVF Conference on Computer Vision and Pattern Recognition, pp. 10781-10790, 2020.

Ronneberger O. et al., "U-Net: Convolutional Networks for Biomedical Image Segmentation", MICCAI'15, LNCS, vol. 9351, pp. 234-241, 2015.

* cited by examiner

AUTOMATIC RIB FRACTURE DETECTION FROM UNFOLDED SCAN IMAGES

FIELD OF THE INVENTION

The invention relates to the field of medical imaging and, in particular, to a method and apparatus for automatically detecting rib fractures from medical imaging scans.

BACKGROUND OF THE INVENTION

Medical professionals commonly acquire medical imaging to identify fractures in a patient's rib cage. Medical imaging, for example Computed Tomography (CT) scans, is a tool used to visualize a patient's anatomy where the visualization data is used to diagnose diseases or injuries. Specifically, in a trauma setting, medical personnel may rely on medical imaging data in the form of a CT scan for diagnostic purposes, for example, the detection of rib fractures. Reading imaging scans and, more specifically, trauma or Emergency Department scans is a time-critical task that needs to be done with high attention to avoid overlooking critical findings. In some cases, where a rib fracture may not be clear, inspection of the rib from different perspectives (e.g. sagittal and coronal view instead of axial view) and examination of the neighboring ribs and lung area for potential indications is required, thus further increasing the inspection time.

Diagnosis of rib fractures requires 24 individual ribs to be traced where each rib spans multiple slices of the imaging scan. Thus, manual inspection is a tedious and time-consuming process. Reliable detection and diagnosis of rib fractures is challenging, and different types of fractures may present different challenges in the detection and diagnosis of the rib fractures, for example, a subtle fracture manifesting as a slight irregularity in the cortical bone.

In the last several years, multiple approaches for automatic rib fracture detection and methods to visualize the patient's rib cage in an intuitive way for simplified human inspection have been introduced. The approaches, however, decouple the automatic fracture detection and the visualization.

Several approaches to simplify the visualization and evaluation of a patient's anatomy and critical structures have been proposed, especially those targeting visualization of the rib cage. While providing some benefit, current approaches come with distinct fundamental limitations.

One well-known visualization scheme is the "filet view" or "fishbone view." This view is based on segmenting the ribs (e.g., using a deep convolutional neural network) followed by a centerline extractor which subsequently labels rib pairs in the field of view. Each rib is sampled along its trace allowing a visualization of each and every rib in a normalized and straightened manner (curved planar reformat). One disadvantage with this type of view is that the nature of processing each rib independently leads to discontinuities between the ribs, which may lead to imaging artifacts from adjacent ribs appearing in rib shapes.

Another visualization scheme is the visceral cavity view. In this view, a segmentation algorithm (e.g., using a model-based approach) is applied to segment the inside of the rib cage in terms of a deformation of a cylindric manifold. Once segmentation is done, the manifold may be unwrapped and a maximum intensity projection (MIP) close to the proximity of the surface may be computed. This view allows the user to inspect the rib cage as a whole in terms of a continuous visualization on the inspection canvas. One of the disadvantages with this type of view is that the relative rib lengths are not maintained. The nature of unwrapping a cylindric manifold does not allow visualization of the correct rib lengths. For example, the first rib appears too long in relation to the other ribs. In addition, the nature of the MIP visualization may not allow detection of subtle fractures. For example, the MIP visualization may make small rib fractures invisible and not detectable in the generated view. Another deficiency is that this view adds significant unrealistic distortions (wavy ribs), which limit clinical confidence in the generated visceral cavity view.

Great demand exists for automated rib fracture detection from medical images, such as a CT image, but automated rib fracture detection is a challenging undertaking. Common deep-learning-based approaches suffer from a trade-off between input resolution and receptive field size due to memory and runtime constraints. In order to identify subtle rib fractures, such as hairline cracks, a high image resolution (e.g. 1 mm isotropic) is required. However, as rib fractures frequently occur on similar positions of neighboring ribs, a large receptive field size is equally beneficial for the task. Furthermore, identifying the position of a fracture on the rib cage from local patches of high resolution is difficult. Irregular parts of the rib, e.g. the tuberculum costae or the sternal rib end may be misinterpreted as buckle or displaced fractures, especially the first and last rib. Current approaches appear to act on the original image orientation and extracted local patches that are then fed into a convolutional neural network. With these approaches, it is difficult to account for the task specific challenges.

Thus, the need exists for an innovative scheme for automatically detecting rib fractures from medical imaging scans.

SUMMARY OF THE INVENTION

The object of the present invention provides a method and apparatus for automatically detecting rib fractures from medical imaging scans. The techniques may be applied to scans generated by a number of imaging systems including CT, CT-arm, Single Photon Emission Computer Tomography CT (SPECT-CT), Magnetic Resonance CT (MR-CT), Positron Emission Tomography CT (PET-CT), and Magnetic Resonance Imaging (MRI) systems.

In order to resolve the trade-off between receptive field size and resolution, the techniques perform rib fracture detection on a reformatted image instead of working on the three-dimensional (3D) reconstructed image volume with cartesian grid. A new manifold view is introduced and chosen as input for a rib fracture detection model.

The new manifold view provides advantages over existing views. For example, in contrast to the "filet view" there are no sampling artifacts (e.g. rib duplicates) and there are strong image edges (e.g. at dividing lines between neighboring ribs or background) eliminating imaging features that may confuse a fracture detector. Compared to the visceral cavity view, the ratio of rib lengths is unchanged and the rib locations are consistent. It is worth noting that the new manifold view is again a three-dimensional volume showing only the rib cage in a standardized substantially smaller image.

According to a first aspect of the invention, an image processing apparatus is provided. The image processing apparatus comprises a mapping function module that includes mapping function circuitry configured to: receive data representative of a three-dimensional diagnostic image, segment ribs and spine according to the received data representative of the three-dimensional diagnostic image, detect and label rib centerlines from the rib segmentation, detect and label vertebra body center landmarks from the spine segmentation, map each three-dimensional position, corresponding to the received data representative of the three-dimensional diagnostic image, of the rib centerlines and the vertebra body center landmarks to a two-dimensional position on a defined two-dimensional manifold plane, interpolate three-dimensional position coordinates missing on the defined two-dimensional manifold plane, which deforms the two-dimensional manifold plane such that it aligns with the detected rib centerlines and vertebra center landmarks in three-dimensional space of the diagnostic image, and, generate a coordinate mapping function, corresponding to the mapped and interpolated positions, from two-dimensional manifold space to three-dimensional image space and inversely.

The image processing apparatus comprises a manifold generating module including manifold processing circuitry configured to: receive the generated coordinate mapping function, sample image intensities, from the three-dimensional diagnostic image space, at each coordinate defined by the deformed two-dimensional manifold plane according to the mapping function, generate a reformatted image as a two-dimensional manifold slice from the sampled image intensities, the two-dimensional manifold slice displaying a continuous and straightened visualization of a rib cage and spine, shift the deformed two-dimensional manifold plane along its normal directions and repeat the sampling to generate a stack of manifold slices covering a complete three-dimensional rib cage visualization.

The image processing apparatus comprises a trained fracture detection module including fracture prediction circuitry configured to: receive, as an input, the generated stack of manifold slices, perform fracture prediction via a trained fracture detection model using machine learning or deep learning techniques, and generate a revised two-dimensional manifold view showing predicted fractures, according to the trained fracture detection model, in the space of the generated stack of manifold slices covering the complete three-dimensional rib cage visualization.

The image processing apparatus also comprises an inverse coordinate transformation module including inverse coordinate transformation circuitry configured to receive, as an input, the mapping function and the revised two-dimensional manifold view showing predicted fractures, and map the predicted fractures from the stack of manifold slices back to the image space of the data representative of the three-dimensional diagnostic image.

In a second aspect of the invention a method of automatically detecting rib fractures is provided. The method comprising: receiving data representative of a three-dimensional diagnostic image, segmenting ribs and spine according to the received data representative of the three-dimensional diagnostic image, detecting and label rib centerlines from the rib segmentation, detecting and label vertebra body center landmarks from the spine segmentation, mapping each three-dimensional position, corresponding to the received data representative of the three-dimensional diagnostic image, of the rib centerlines and the vertebra body center landmarks to a two-dimensional position on a defined two-dimensional manifold plane, interpolating three-dimensional position coordinates missing on the defined two-dimensional manifold plane, which deforms the two-dimensional manifold plane such that it aligns with the detected rib centerlines and vertebra center landmarks in three-dimensional space of the diagnostic image, generating a coordinate mapping function corresponding to the mapped and interpolated positions, from two-dimensional manifold space to three-dimensional image space and inversely, receiving the generated coordinate mapping function, sampling image intensities, from the three-dimensional diagnostic image space, at each coordinate defined by the deformed two-dimensional manifold plane according to the mapping function, generating a reformatted image as a two-dimensional manifold slice from the sampled image intensities, the two-dimensional manifold slice displaying a continuous and straightened visualization of a rib cage and spine, shifting the deformed two-dimensional manifold plane along its normal directions and repeating the sampling to generate a stack of manifold slices covering a complete three-dimensional rib cage visualization, receiving the generated stack of manifold slices as an input to a trained fracture detection model, performing fracture prediction via the trained fracture detection model according to machine learning or deep learning techniques, generating a revised two-dimensional manifold view showing predicted fractures, according to the trained fracture detection model, in the space of the generated stack of manifold slices covering the complete three-dimensional rib cage visualization, receiving the mapping function and the revised two-dimensional manifold view showing predicted fractures, and mapping the predicted fractures from the stack of manifold slices back to the image space of the data representative of the three-dimensional diagnostic image.

In a third aspect of the invention, a non-transitory computer-readable medium having stored thereon instructions for causing processing circuitry to execute a process is provided. The process comprising: receiving data representative of a three-dimensional diagnostic image, segmenting ribs and spine according to the received data representative of the three-dimensional diagnostic image, detecting and label rib centerlines from the rib segmentation, detecting and label vertebra body center landmarks from the spine segmentation, mapping each three-dimensional position, corresponding to the received data representative of the three-dimensional diagnostic image, of the rib centerlines and the vertebra body center landmarks to a two-dimensional position on a defined two-dimensional manifold plane, interpolating three-dimensional position coordinates missing on the defined two-dimensional manifold plane, which deforms the two-dimensional manifold plane such that it aligns with the detected rib centerlines and vertebra center landmarks in three-dimensional space of the diagnostic image, generating a coordinate mapping function corresponding to the mapped and interpolated positions, from two-dimensional manifold space to three-dimensional image space and inversely, receiving the generated coordinate mapping function, sampling image intensities, from the three-dimensional diagnostic image space, at each coordinate defined by the deformed two-dimensional manifold plane according to the mapping function, generating a reformatted image as a two-dimensional manifold slice from the sampled image intensities, the two-dimensional manifold slice displaying a continuous and straightened visualization of a rib cage and spine, shifting the deformed two-dimensional manifold plane along its normal directions and repeating the sampling to generate a stack of manifold slices covering a complete three-dimensional rib cage visualization, receiving the generated stack of manifold slices as an input to a trained fracture detection model, performing fracture prediction via the trained fracture detection model according to machine learning or deep learning techniques, generating a revised two-dimensional manifold view showing predicted fractures, according to the trained fracture detection model, in the space of the generated stack of manifold slices covering the complete three-dimensional rib cage visualization, receiving the mapping function and the revised two-dimensional manifold view showing predicted fractures, mapping the predicted fractures from the stack of manifold slices back to the image space of the data representative of the three-dimensional diagnostic image.

In a preferred embodiment, a transformation module includes transformation circuitry configured to receive, as an input, the generated stack of manifold slices and the mapping function, generate an annotated stack of manifold slices by repeating the sampling, generating, and shifting of the manifold processing circuitry using a three-dimensional annotation mask or three-dimensional annotation landmarks as the sampling input, and generate an annotation mask or set of annotation landmarks defined in the generated stack of manifold slices by mapping annotated fractures from the three-dimensional image space to a three-dimensional annotated stack of manifold slices according to the mapping function. The trained fracture detection module receives the generated stack of manifold slices and the generated annotated stack of manifold slices as an input to train the trained fracture detection model.

In an aspect of the invention, the trained fracture detection module receives the generated stack of manifold slices and the generated annotated stack of manifold slices as an input to train the trained fracture detection model. In a preferred embodiment, the trained fracture detection model is trained according to a slice-wise single-shot or a patch-based model. The receptive field sizes are tuned along in the defined stack of manifold slices, such that fractures at neighboring ribs are captured during trained fracture detection model training.

According to another aspect of the invention, the predicted fractures are shown in the space of the stack of manifold slices or in the space of the diagnostic image as a list of landmarks or voxel-wise annotations with respective colorized overlays. In addition, a number of predicted fractures per rib is determined and shown in the space of the stack of manifold slices or in the space of the diagnostic image.

In a further aspect of the invention, the predicted fractures are subsequently analyzed by a classification model.

In a preferred embodiment interpolating the missing coordinates on the two-dimensional manifold is performed via interpolation techniques including thin plate splines. In an aspect of the invention, additional inputs to the trained fracture detection module include scan images and annotations from previous imaging scans.

DETAILED DESCRIPTION OF EMBODIMENTS

Figure 1:
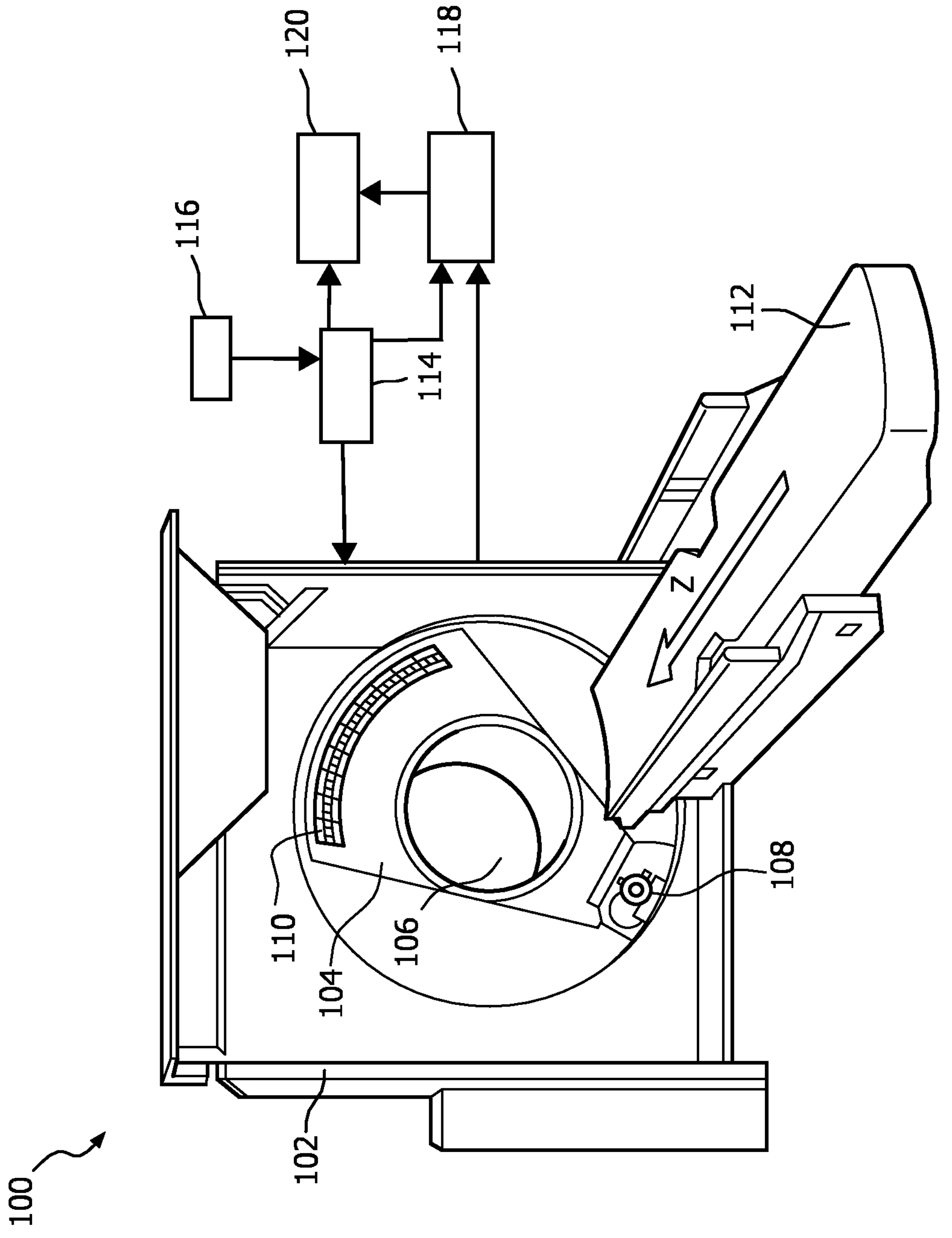
FIG. 1 is a diagram of an exemplary imaging system.

FIG. 1 illustrates an imaging system 100 such as a computed tomography (CT) imaging system. The imaging system 100 includes a generally stationary gantry 102 and a rotating gantry 104. The rotating gantry 104 is rotatably supported by the stationary gantry 102 and rotates in relation to the stationary gantry 102 around an examination region 106 about a longitudinal or z-axis.

A patient support 112, such as a couch, supports an object or examination subject, such as a human patient in the examination region 106. The support 112 is configured to move the object or examination subject for loading, scanning, and unloading of the object or examination subject.

A radiation source 108, such as an x-ray tube, is rotatably supported by the rotating gantry 104. The radiation source 108 rotates with the rotating gantry 104 and emits radiation that traverses the examination region 106.

A radiation sensitive detector array 110 subtends an angular arc opposite the radiation source 108 across the examination region 106. The detector array 110 includes one or more rows of detectors that extend along the z-axis direction, detects radiation traversing the examination region 106, and generates projection data indicative thereof.

A general-purpose computing system or computer serves as an operator console 114 and includes an input device(s) 116 such as a mouse, a keyboard, and/or the like and an output device(s) 120 such as a display monitor, a filmer or the like. The console 114 allows an operator to control the operation of the system 100. This includes control of an image processing apparatus 118. The image processing apparatus 118 may receive data representative of a three-dimensional (3D) diagnostic image generated by the imaging system 100 and generate a reformatted image displaying predicted rib fractures in the image space of the three-dimensional (3D) diagnostic image. The reformatted image may be output to output device 120 for reading by a radiologist or other medical personal.

It is to be appreciated that processing of the image processing apparatus 118 can be implemented through a processor(s) and/or processing circuitry, which execute a computer readable instruction(s), such as executable code, encoded or embedded on computer readable storage medium, such as physical memory and other non-transitory medium. Additionally or alternatively, the processor(s) and/or processing circuitry can execute a computer readable instruction(s) carried by a carrier wave, a signal and other transitory (or non, non-transitory) medium.

Figure 2:
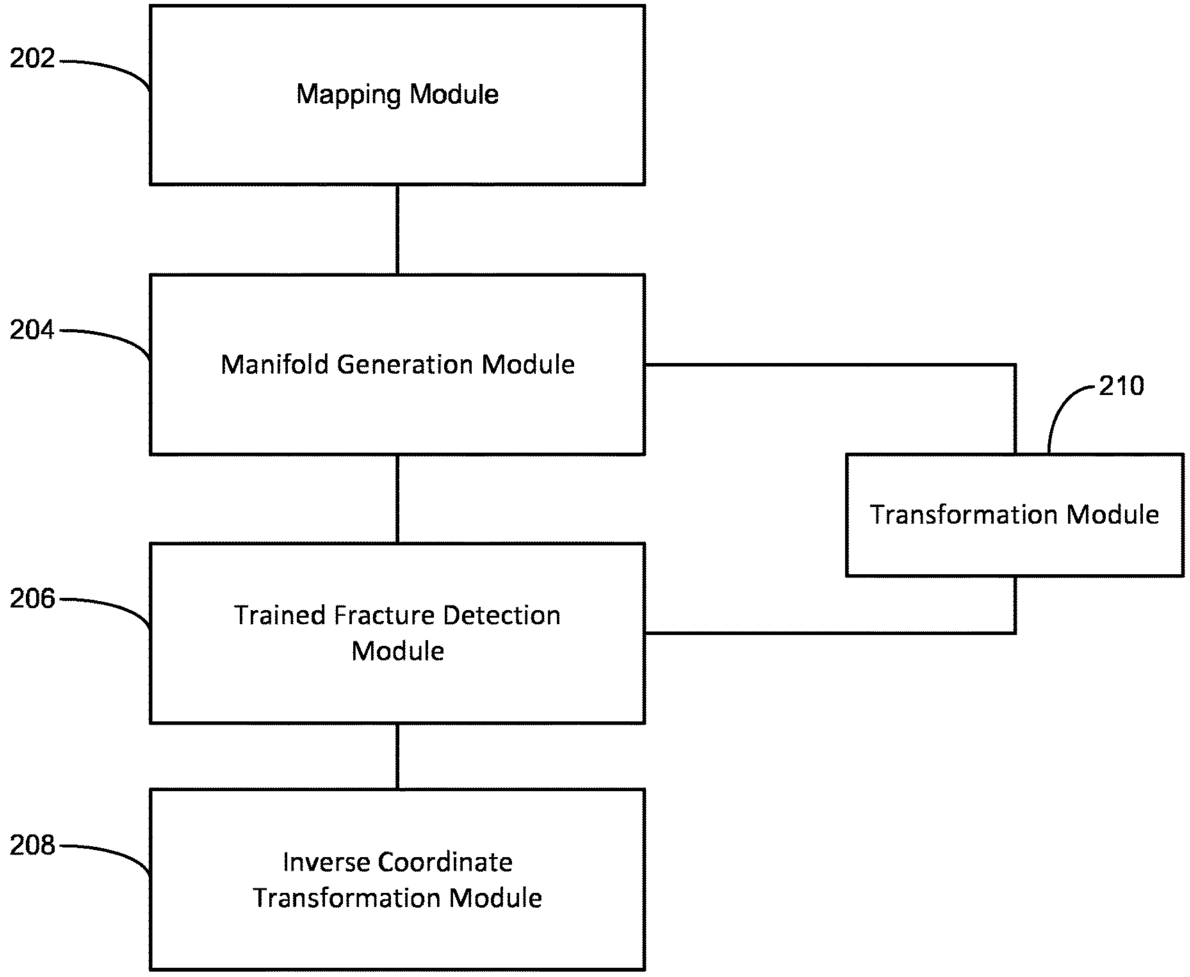
FIG. 2 illustrates components of an imaging processing apparatus according to an embodiment.

FIG. 2 illustrates several components of the image processing apparatus 118 according to some embodiments. At mapping module 202*a* three-dimensional (3D) diagnostic image generated by an imaging system, for example the CT imaging system 100, is received. The ribs and spine are automatically segmented. Segmenting may be performed using machine learning or deep learning techniques. As an example, Convolutional Neural Networks (CNNs) are a deep learning technique that may be used to segment the ribs and spine. CNN architectures, such as U-Net and V-Net, may be adapted for a segmentation task. Deep learning based training, using datasets from hundreds of scans, may be used to develop algorithms that are shown to achieve fast and accurate segmentation of the ribs and spine. The ribs are detected and the rib centerlines are extracted and labeled, and vertebra body center landmarks are detected and labeled. Each three-dimensional (3D) position of the rib centerlines and the vertebra center landmarks corresponding to the received data representative of the 3D diagnostic image is mapped to a two-dimensional (2D) position on a defined two-dimensional manifold plane.

Since the rib and vertebra positions are known in 3D space, correlations for all rib centerlines and all vertebra landmarks can be built up. That is, coordinate correspondences from 3D space to 2D space may be defined as a mapping function. Once the 3D to 2D correspondences are established or setup, correspondences or correlations from the remaining pixels in the defined 2D space may be missing. Those 3D position coordinates that are missing on the defined 2D manifold plane are interpolated, thereby deforming the two-dimensional manifold plane, such that it aligns with the detected rib centerlines and vertebra center landmarks in 3D space of the diagnostic image. Finally, a coordinate mapping function corresponding to the mapped and interpolated positions, from 2D manifold space to 3D image space, and inversely, is generated.

The generated mapping function is received at the manifold generation module 204. Image intensities from the 3D diagnostic image space are sampled at each coordinate defined by the deformed 2D manifold plane according to the received mapping function. A reformatted image is generated as a 2D manifold slice from the sampled image intensities. The 2D manifold slice displays a continuous and straightened visualization of the rib cage and spine. A stack of manifold slices is generated by shifting the deformed 2D manifold plane along its normal directions, toward the inside and outside of the manifold plane, and repeating the sampling for each incremental shift along the normal direction.

Figure 3:
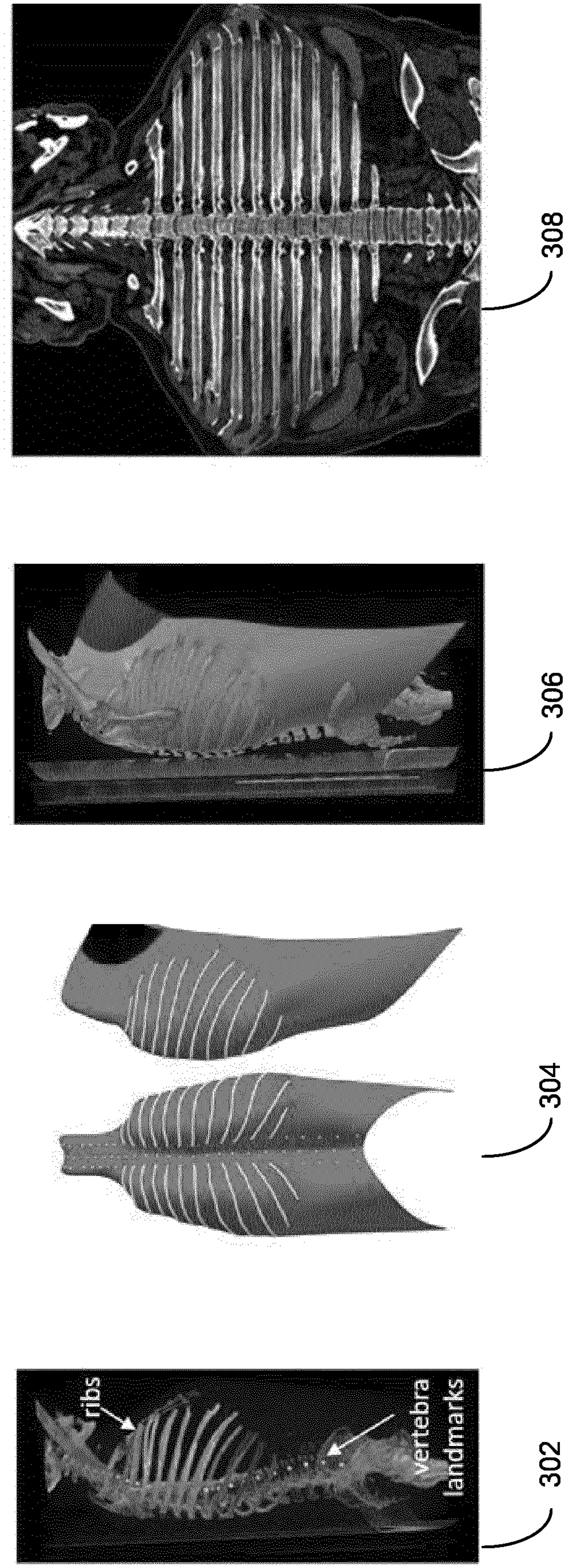
FIG. 3 illustrates a processing workflow according to an embodiment.

The process of generating a new manifold view is illustrated in FIG. 3. At 302 rib centerlines and vertebra body center landmarks are detected and labeled according to an automated segmentation scheme. As discussed, the automated segmentation scheme may be based on machine learning or deep learning techniques. A 2D manifold, which will show the resulting new manifold view, is defined. At 304 the interpolation scheme deforms the 2D manifold such that it aligns with the detected rib centerlines and vertebra center landmarks. Thin plate splines or any appropriate interpolation scheme may be used as an interpolation scheme. As illustrated in 304, a defined 2D manifold is deformed to align with the detected rib centerlines and vertebra landmarks mapped from 3D space to the 2D space of the 2D deformed manifold.

Image intensities from the 3D image space are sampled at each coordinate of the deformed 2D manifold to complete or fill in the missing 3D coordinates. The result is illustrated at 306. The missing 3D coordinates may correspond to a region of tissue between the ribs and a region of tissue boarding the ribs or any combination of a region of tissue between the ribs and a region of tissue boarding the ribs. This allows the deformed 2D manifold to be unfolded.

The unfolded 2D manifold is illustrated at 308. The new manifold view, illustrated at 308, combines the advantages of both the filet and visceral cavity views but avoids the disadvantages of both the filet and visceral cavity views. It can be seen at 308 that a normalized and straightened view of the ribs is displayed while maintaining the relative rib lengths. Avoided are discontinuities between the ribs, imaging artifacts appearing from adjacent rib positions, incorrect rib length, and invisible fractures and distortions due to MIP.

Figure 4:
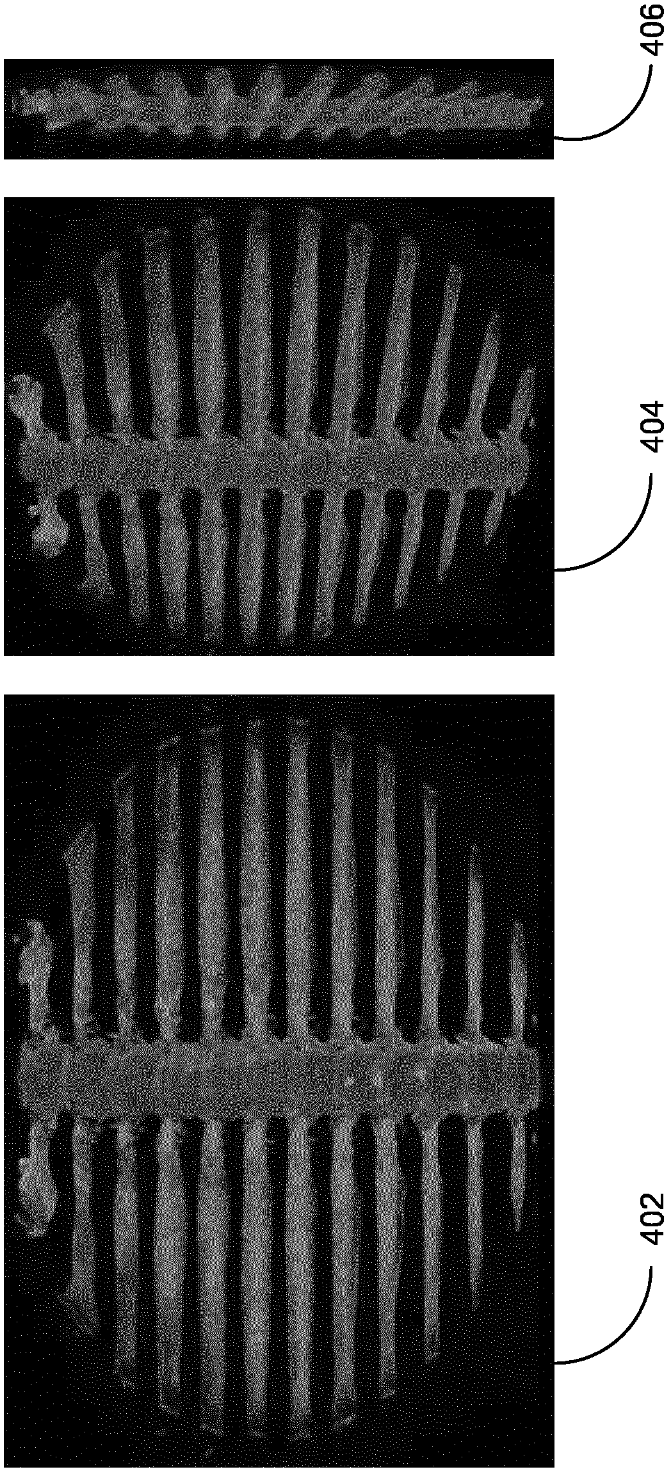
FIG. 4 illustrates a 3D view of the ribs and spine according to an embodiment.

FIG. 4 illustrates a 3D view of the ribs and spine derived from the generated stack of manifold slices covering a complete three-dimensional rib cage visualization. The 3D visualization of the rib cage and vertebra body centers may be generated by shifting or moving the deformed 2D manifold plane along its normal directions, toward the inside and outside of the manifold plane, multiple times and repeating the sampling to generate the stack of 2D manifold slices. This results in a 3D image as a stack of manifolds covering the complete rib cage. FIG. 4 illustrates that the resulting 3D image allows inclusion of all ribs as a whole. The generated 3D rendering is shown at 402. The view at 404 is rotated about thirty degrees, and the view at 406 is rotated slightly under ninety degrees.

Returning to FIG. 2, the generated stack of manifold slices is received at trained fracture detection module 206. The fracture detection module generates a revised 2D manifold view showing predicted fractures in the space of the generated stack of manifold slices covering the complete three-dimensional rib cage visualization. Fracture prediction is performed using a trained fracture detection model.

The mapping function and revised 2D manifold showing predicted fractures are received at inverse coordinate transformation module 208. The inverse coordinate transformation module 208 maps the predicted fractures from the revised stack of manifold slices back to the image space of the data representative of the 3D diagnostic image. Thus, the predicted fractures can be visualized on the manifold view or mapped back to the original 3D diagnostic image.

It should be understood that the process of each component illustrated in FIG. 2, mapping module, manifold generation module, trained fracture detection module, inverse coordinate transformation module, and transformation module can be implemented through generic or task specific circuitry and/or a processor(s), which execute a computer readable instruction(s) encoded or embedded on computer readable storage medium, such as physical memory and other non-transitory medium. Additionally or alternatively, the processor(s) can execute a computer readable instruction(s) carried by a carrier wave, a signal and other transitory (or non, non-transitory) medium.

Figure 5:
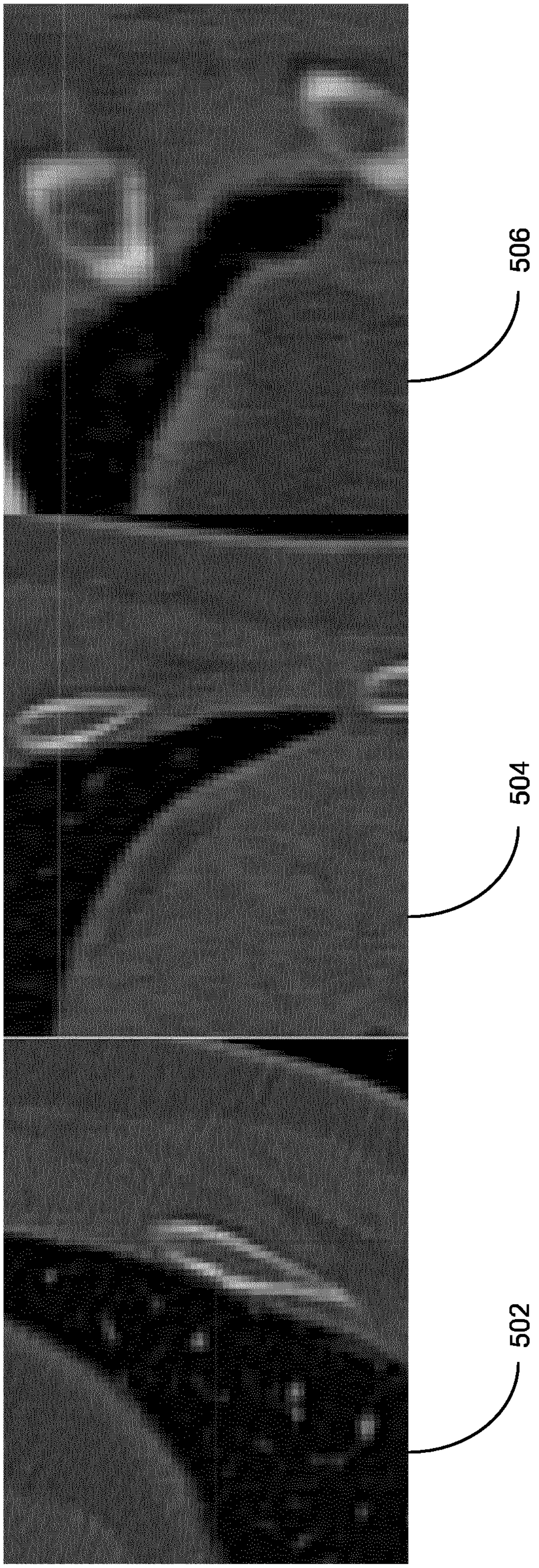
FIG. 5 illustrates an example of a subtle rib fracture.

FIG. 5 illustrates an example of a subtle rib fracture in axial view 502, coronal view 504, and sagittal view 506. The fracture is manifested as slight irregularity in the cortical bone and best visible in the sagittal view plane 506. FIG. 5 illustrates an example of challenges encountered in implementing automatic fraction detection. The fixed size and normalized rib coordinates provided by the new manifold view enable the described automatic rib fracture detection.

Figure 6:
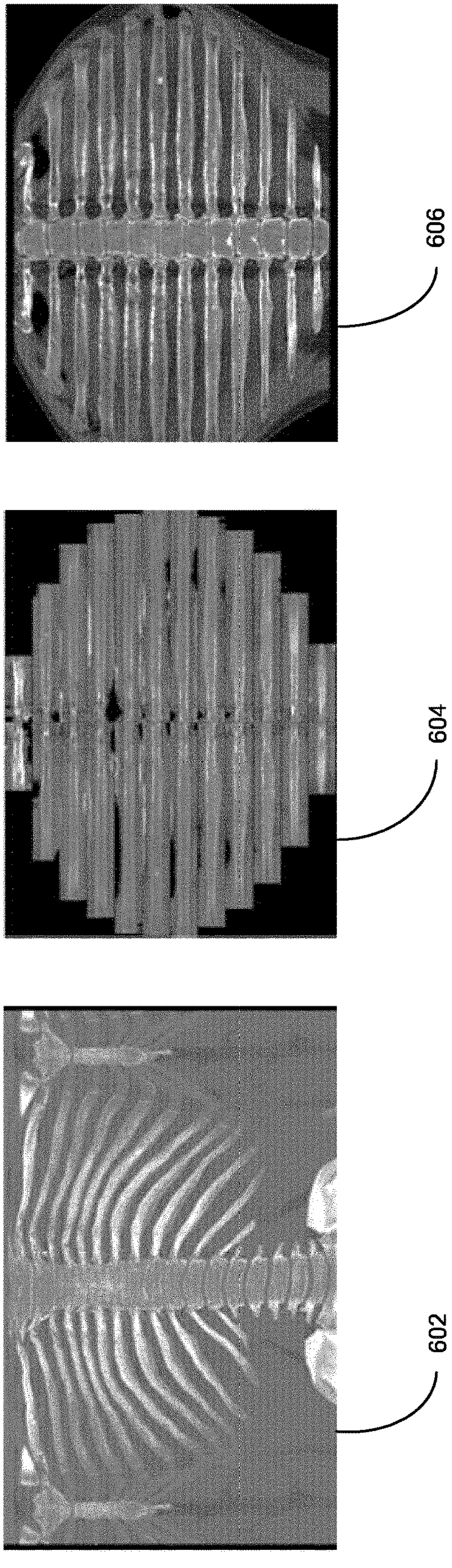
FIG. 6 illustrates a visceral cavity view of a rib cage, a filet view of the rib cage, and a new manifold view of the rib cage.

FIG. 6 illustrates rib visualizations simplified for inspection by medical professionals such as a radiologist. A visceral cavity view is illustrated at 602, a filet view is illustrated at 604, and the new manifold view is illustrated at 606.

In order to resolve the trade-off between receptive field size and resolution, rib fracture detection is performed on a reformatted image instead of working on the 3D reconstructed image volume with cartesian grid. More precisely, the new manifold view illustrated at 606, but limited to the rib cage, is chosen as input for the rib fracture detection model. In contrast to the filet view 604, sampling artifacts (e.g. rib duplicates) and discontinuities between the ribs that may confuse the fracture detector are eliminated. Compared to the visceral cavity view 602 the ratio of rib lengths and the rib locations are consistent. In other words, the new manifold view has no sampling artifacts and has strong image edges while maintaining rib lengths and locations.

Applying the new manifold view, the automatic fracture detection shows a significant improvement compared to earlier views (filet view and visceral cavity). The fixed size of the new manifold view leads to consistent fracture detection durations. Additional benefits of the proposed solution include: fast inference with potential single shot deployment (i.e. no patch sampling during training & testing), increased sensitivity due to a large receptive field which captures potential fractures in adjacent ribs and concomitant symptoms (e.g. pneumothorax or hemothorax), reduced number of false positives due to normalized coordinates (locations of, e.g., end of ribs, first/last ribs are pre-defined), and easier temporal comparison and inspection of follow up scans due to normalized coordinates. Fracture predictions of previous scans can be overlaid to novel CT scans to investigate the healing progress. Previous CT scans and predictions can also be considered during fracture prediction, and inference is limited to the rib cage leading to higher robustness against variations of FOV.

Returning back to FIG. 2, components of the image processing apparatus include transformation module 210. Transformation module 210 generates data as an input to train the trained fracture detection model.

The stack of manifold slices generated at 204 and the mapping function generated at 202 are received at transformation module 210. Transformation module 210 generates an annotated stack of manifold slices by repeating the sampling, generating, and shifting as performed by the manifold processing circuitry, but using a three-dimensional annotation mask or three-dimensional annotation landmarks as the sampling input. Transformation module 210 then generates an annotation mask or set of annotation landmarks defined in the generated stack of manifold slices by mapping annotated fractures from the three-dimensional image space to a three-dimensional annotated stack of manifold slices according to the mapping function. The generated stack of manifold slices and the generated annotated stack of manifold slices are received by the trained fracture detection module as an input to train the trained fracture detection model.

A set of reconstructed 3D images in the form of the generated stack of manifold slices covering a complete three-dimensional rib cage visualization and corresponding target rib fracture annotations (e.g. in form of label masks, bounding boxes or point annotations) are needed to build the learning data base. In an embodiment, data is collected via manual annotation. First, the manifold mapping is determined. For each case, the mapping module 202 takes a 3D image as input. The individual rib centerlines are extracted and labelled, and a manifold is determined using thin plate spline interpolation/smoothing, whereby the centerline positions are mapped to predefined positions at manifold generation module 204. Manifold generation module 204 delivers as an output the coordinate mapping function, which is used by the transformation module 210 to resample the image data and to transform the corresponding 3D annotation mask of 3D labels. The shape of the resampled multi-slice 2D manifold is arbitrary but fixed among all cases.

Convolutional Neural Networks (CNNs) are a deep learning technique that may be used to develop the learning model. CNN architectures, such as U-Net and EfficientDet, may be adapted types of learning models. Deep learning based training, using datasets from hundreds of scans, may be used to build the learning data base.

Due to the inherent properties of the 2D manifold stack (e.g. fixed size, manifold smoothness and normalized coordinates) different types of learning models can be tuned for the dedicated application on the images generated at transformation module 201. Two different kinds of learning models may be distinguished, namely (1) single-shot models such as EfficientDet where the receptive field captures the whole input volume, or (2) patch-based models like the U-Net with a local receptive field which processes the volume patch-wise in a sliding window fashion. In the case of patch-based approaches, the patch and receptive field size may be tuned along the 2D manifolds x and y axis in such a way that fractures at neighboring ribs are captured. Furthermore, the location information of each patch can be provided as an additional input channel, e.g. in the form of a distance map. For any model used, the z-axis of the manifold can either be handled as channel axis or as additional spatial image axis. Limiting pooling operations to the x and y axis can further boost the model performance due to the low stack width (i.e. number voxels along the z-dimension).

The trained fracture detection model may be continuously fined-tuned with data generated at transformation module 210. In an embodiment, the trained fracture detection model is tuned to a predetermined threshold such that fine-tuning is no longer required. In other words, the learning data base may be sufficiently built such that additional data is no longer needed. Therefore, in an embodiment, automatic fracture detection may be performed without transformation module 210.

The predicted fracture regions may be shown to the user as a list of landmarks or colorized overlays on the 2D manifold view, and a number of predicted fractures per rib may be determined and shown to the user. This may provide the user with an indication of the stability of the rib. Inverse coordinate transformation module 208 receives as an input the mapping function provided by mapping module 202 and the model predictions on the manifold stack generated at 206. It maps the model predictions back to the original 3D image space for further visualization.

Figure 7:
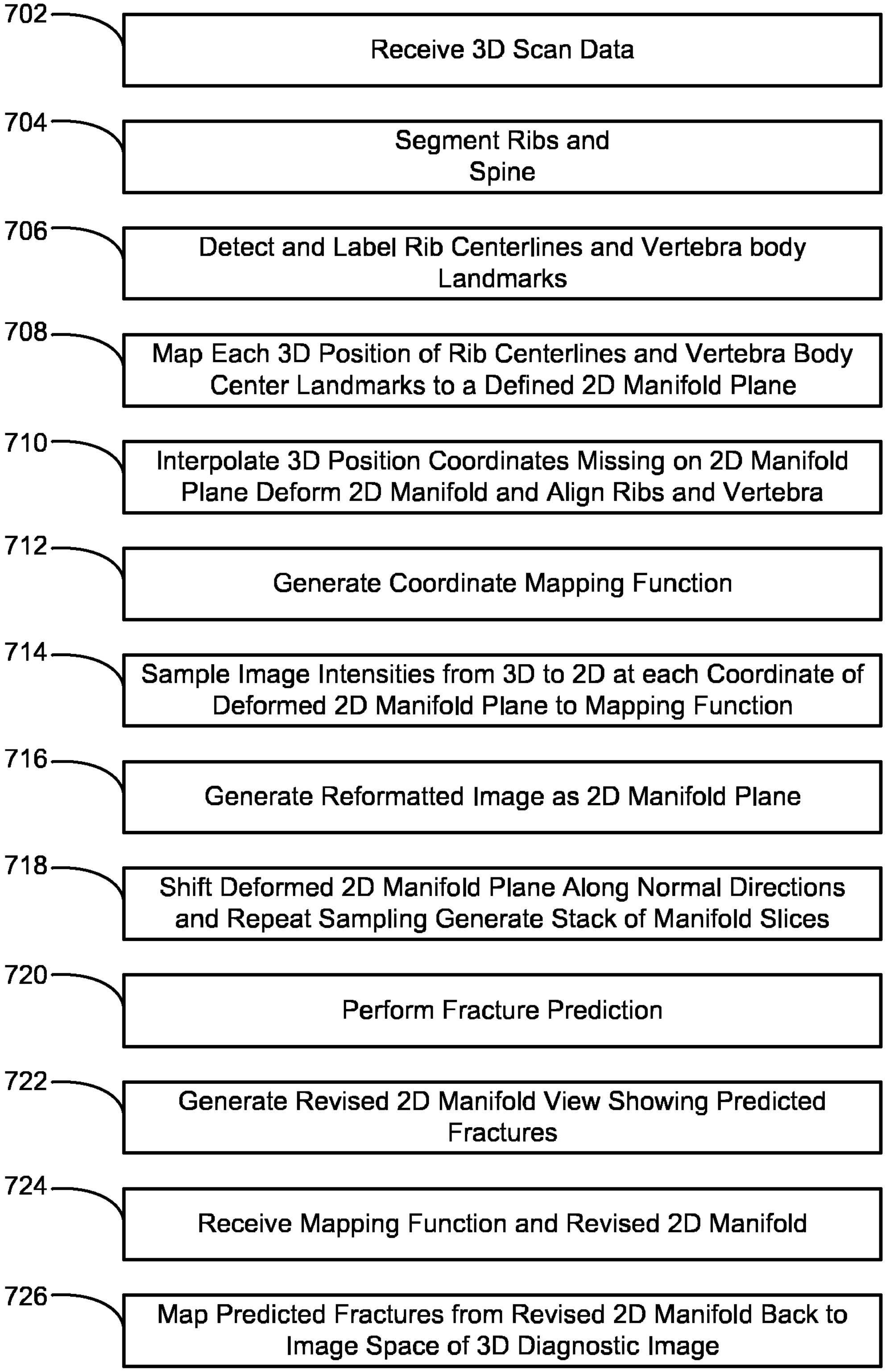
FIG. 7 is a flowchart representing a method of automatic fracture according to an embodiment.

FIG. 7 is a flowchart representing a method for automatically detecting rib fractures in a 3D diagnostic image. The 3D image may be generated from a number of imaging systems including CT, CT-arm, SPECT-CT, MR-CT, PET-CT, and (MRI) systems as an example. Data representative of the 3D diagnostic image is received at 702. At 704, the ribs and spine are segmented according to the received data representative of the 3D diagnostic image, and at 706 rib centerlines and vertebra body center landmarks are detected and labeled. This is illustrated at 302 of FIG. 3. At 708, each three-dimensional position, corresponding to the received data representative of the 3D diagnostic image, of the rib centerlines and the vertebra body center landmarks are mapped to a 2D position on a defined 2D manifold plane. Those 3D position coordinates missing on the defined 2D manifold plane are interpolated at 710, deforming the 2D manifold plane, such that it aligns with the detected rib centerlines and vertebra center landmarks in 3D space of the diagnostic image. This can be seen at 304 of FIG. 3. In a preferred embodiment, thin plate splines is chosen as an interpolation and smoothing technique.

At 712, a coordinate mapping function is generated. The coordinate mapping function corresponds to the mapped and interpolated positions from 2D manifold space to 3D image space and in reverse. At 714, image intensities from the three-dimensional diagnostic image space are sampled at each coordinate defined by the deformed 2D manifold plane according to the mapping function as illustrated at 306 of FIG. 3.

At 716, a reformatted image is generated as a 2D manifold slice from the sampled image intensities, the 2D manifold slice displaying a continuous and straightened visualization of a rib cage and spine. The generated 2D manifold slice is the new manifold view illustrated at 606 in FIG. 6. At 718, the deformed 2D manifold plane is shifted along its normal directions and the sampling is repeated as the 2D manifold plane is incrementally shifted along its normal directions to generate a stack of manifold slices covering a complete three-dimensional rib cage visualization, as illustrated in FIG. 4.

At 720, fracture detection is preformed via a trained fracture detection model using machine learning or deep learning techniques. The generated stack of manifold slices are received as an input, and at 722*a* revised 2D manifold view is generated in the space of the generated stack of manifold slices according to the trained fracture detection model. Thus, the revised 2D manifold view covers the complete 3D rib cage visualization with the predicted fractures mapped to the revised 2D manifold view. The predicted fractures may be shown to the user as a list of landmarks/bounding boxes or colorized overlays on the revised 2D manifold view, and a number of predicted fractures per rib may be shown to the user.

The revised 2D manifold view showing the predicted fractures and the mapping function is received at 724. At 726, the predicted fractures from the revised stack of manifold slices are mapped back to the image space of the 3D diagnostic image. Thus, the fracture predictions may be mapped back to the original image space for further inspection by a radiologist.

While the invention has been illustrated and described in detail in the drawings and foregoing description, such illustrations and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, determining, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for detecting a fracture in medical images, comprising:
- a memory that stores a plurality of instructions; and
- at least one processor coupled to the memory and configured to execute the plurality of instructions to:
  - detect and label rib centerlines and vertebra body center landmarks based on, respectively, rib segmentation and spine segmentation;
  - map each three-dimensional (3D) position of the rib centerlines and the vertebra body center landmarks to a respective two-dimensional (2D) position on a 2D manifold image;
  - interpolate coordinates of each 3D position missing on the 2D manifold image, such that the 2D manifold image aligns with the detected rib centerlines and vertebra center landmarks in the 3D image;
  - sample image intensities at each coordinate of the 2D manifold image to reformat the 2D manifold image;
  - predict a fracture via a trained fracture detection model using machine learning or deep learning; and
  - revise the reformatted 2D manifold image to show the predicted fracture according to the trained fracture detection model.

2. The apparatus of claim 1, wherein the at least one processor is further configured to map the predicted fracture from the revised 2D manifold image to the 3D image of a 3D rib cage.

3. The apparatus of claim 1, wherein the at least one processor is further configured to shift the reformatted 2D manifold image along a normal direction and repeat the sampling to generate a stack of manifold slices covering a complete 3D visualization of a rib cage and a spine.

4. The apparatus of claim 3, wherein the at least one processor is further configured to:
- generate an annotated stack of manifold slices using a 3D annotation mask or 3D annotation landmarks as a sampling input; and
- generate an annotation mask or set of annotation landmarks defined in the generated stack of manifold slices by mapping annotated fractures from the 3D image to a 3D annotated stack of manifold slices according to a mapping function.

5. The apparatus according to claim 3, wherein the predicted fracture is shown in the stack of manifold slices or the 3D image as a list of landmarks or voxel-wise annotations with respective colorized overlays, and wherein a number of predicted fractures per rib is determined and shown in the stack of manifold slices or in the 3D image.

6. The apparatus according to claim 1, wherein the predicted fracture is subsequently analyzed by a classification model.

7. The apparatus according to claim 1, wherein interpolating the missing coordinates on the manifold is performed via interpolation techniques including thin plate splines.

8. A computer implemented method for detecting a fracture in medical images, the method comprising:
- detecting and labeling rib centerlines and vertebra body center landmarks based on, respectively, rib segmentation and spine segmentation;
- mapping each three-dimensional (3D) position of the rib centerlines and the vertebra body center landmarks to a respective two-dimensional (2D) position on a 2D manifold image;
- interpolating coordinates of each 3D position missing on the 2D manifold image, such that the 2D manifold image aligns with the detected rib centerlines and vertebra center landmarks in the 3D image;
- sampling image intensities at each coordinate of the 2D manifold image to reformat the 2D manifold image;
- predicting the fracture via a trained fracture detection model using machine learning or deep learning; and
- revising the reformatted 2D manifold image to show the predicted fracture according to the trained fracture detection model.

9. The method of claim 8, further comprising mapping the predicted fracture from the revised 2D manifold image to the 3D image of a 3D rib cage.

10. The method of claim 8, further comprising shifting the reformatted 2D manifold image along a normal direction and repeating the sampling to generate a stack of manifold slices covering a complete 3D visualization of a rib cage and a spine.

11. The method of claim 10, further comprising:

generating an annotated stack of manifold slices using a 3D annotation mask or 3D annotation landmarks as a sampling input; and generating an annotation mask or set of annotation landmarks defined in the generated stack of manifold slices by mapping annotated fractures from the 3D image to a 3D annotated stack of manifold slices according to a mapping function.

12. The method according to claim 10, wherein the predicted fracture is shown in the stack of manifold slices or the 3D image as a list of landmarks or voxel-wise annotations with respective colorized overlays, and wherein a number of predicted fractures per rib is determined and shown in the stack of manifold slices or in the 3D image.

13. The method according to claim 8, wherein the predicted fracture is subsequently analyzed by a classification model.

14. The method according to claim 8, wherein interpolating the missing coordinates on the manifold is performed via interpolation techniques including thin plate splines.

15. A non-transitory computer-readable medium for storing executable instructions, which cause a method to be performed to detect a fracture in medical images, the method comprising:

detecting and labeling rib centerlines and vertebra body center landmarks based on, respectively, rib segmentation and spine segmentation;

mapping each three-dimensional (3D) position of the rib centerlines and the vertebra body center landmarks to a respective two-dimensional (2D) position on a 2D manifold image;

interpolating coordinates of each 3D position missing on the 2D manifold image, such that the 2D manifold image aligns with the detected rib centerlines and vertebra center landmarks in the 3D image;

sampling image intensities at each coordinate of the 2D manifold image to reformat the 2D manifold image;

predicting the fracture via a trained fracture detection model using machine learning or deep learning; and revising the reformatted 2D manifold image to show the predicted fracture according to the trained fracture detection model.

* * * * *